(12) United States Patent
Wang et al.

(10) Patent No.: US 7,823,154 B2
(45) Date of Patent: Oct. 26, 2010

(54) SYSTEM AND METHOD FOR PROVIDING, BY A PLURALITY OF SCHEDULERS, DIFFERENTIATED SERVICE TO CONSUMERS OF DISTRIBUTED RESOURCES

(75) Inventors: Yin Wang, Ann Arbor, MI (US); Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1440 days.

(21) Appl. No.: 11/228,901

(22) Filed: Sep. 16, 2005

(65) Prior Publication Data

US 2007/0064711 A1    Mar. 22, 2007

(51) Int. Cl.
*G06F 9/46* (2006.01)
*H04L 12/28* (2006.01)
*G06F 15/173* (2006.01)

(52) U.S. Cl. ............... 718/102; 370/395.4; 709/226
(58) Field of Classification Search .............. 718/102
See application file for complete search history.

(56) References Cited

U.S. PATENT DOCUMENTS

| | | | |
|---|---|---|---|
| 6,909,691 B1 * | 6/2005 | Goyal et al. | 370/230 |
| 7,009,989 B2 * | 3/2006 | Lavigne et al. | 370/413 |
| 7,120,442 B2 * | 10/2006 | Kim et al. | 455/450 |
| 7,254,813 B2 * | 8/2007 | Leong et al. | 718/104 |
| 7,363,629 B2 * | 4/2008 | Springer et al. | 719/314 |
| 7,447,873 B1 * | 11/2008 | Nordquist | 712/22 |
| 7,525,970 B2 * | 4/2009 | Mangin et al. | 370/395.21 |
| 7,644,162 B1 * | 1/2010 | Zhu et al. | 709/226 |
| 2006/0080472 A1 * | 4/2006 | Ware | 710/6 |

OTHER PUBLICATIONS

Chambliss, D. et al., "Performance virtualization for large-scale storage systems", Proc. 22nd International Symposium on Reliable Distributed Systems (SRDS '03), 10 pages, 2004.
Gulati, A. et al., "Lexicographic QoS Scheduling for Parallel I/O", SPAA /05, Jul. 2005, Las Vegas, NV, pp. 29-38.
Huang, L. et al., "Multi-Dimensional Storage Virtualization", SIGMETRICS/Performance /04, New York, NY, pp. 14-24 , 2004.
Jin, W. et al., "Interposed Proportional Sharing for a Storage Service Utility", SIGMETRICS/Performance /04, New York, NY, pp. 37-48, 2004.

(Continued)

*Primary Examiner*—Emerson C Puente
*Assistant Examiner*—Camquy Truong

(57) ABSTRACT

One embodiment of the present invention provides a method comprising assigning a first weight to a first consumer and a second weight to a second consumer. The method further comprises receiving at a first scheduler a request for service by a first resource to the first consumer; receiving at a second scheduler a request for service by a second resource to the first consumer; and receiving at the first scheduler a request for service by the first resource to the second consumer. The method further comprises scheduling, by the first and second schedulers, service from the first and second resources to the first and second consumers, wherein the scheduling maintains total service provided by the first and second resources to the first and second consumers in proportion to the respective weights of the first and second consumers without requiring the first and second schedulers to communicate with each other.

46 Claims, 7 Drawing Sheets

OTHER PUBLICATIONS

Karlsson, M. et al., "Triage: Performance Isolation and Differentiation for Storage Systems", Proc. of 9th International Workshop on Quality of Service (IWQoS) 2004, 22 pages.

Lumb, C. et al., "Facade: virtual storage devices with performance guarantees", Proceeds of the 2nd USENIX Conf. on File and Storage Technologies, 2003, pp. 131-144.

Saito, Y. et al., "FAB: Building Distributed Enterprise Disk Arrays from Commodity Components", ASPLOS, 2004, Boston, MA, 11 pages.

Zhang, J. et al., "An Interposed 2-Level I/O Scheduling Framework for Performance Virtualization", SIGMETRICS Jun. 2005, Banff, Alberta, pp. 406-407.

* cited by examiner

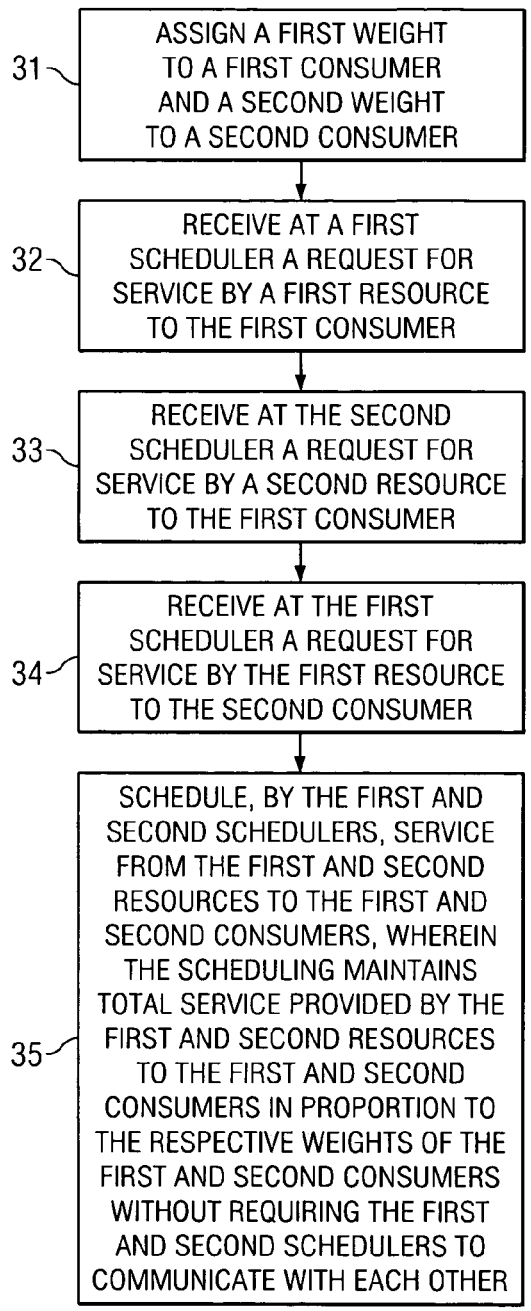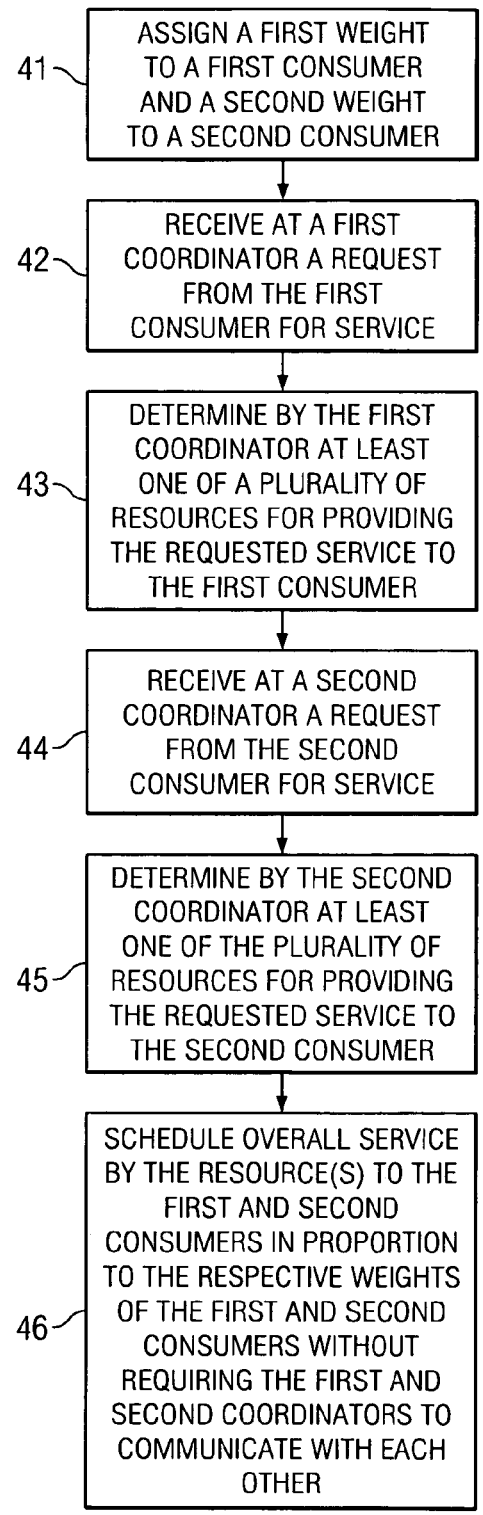

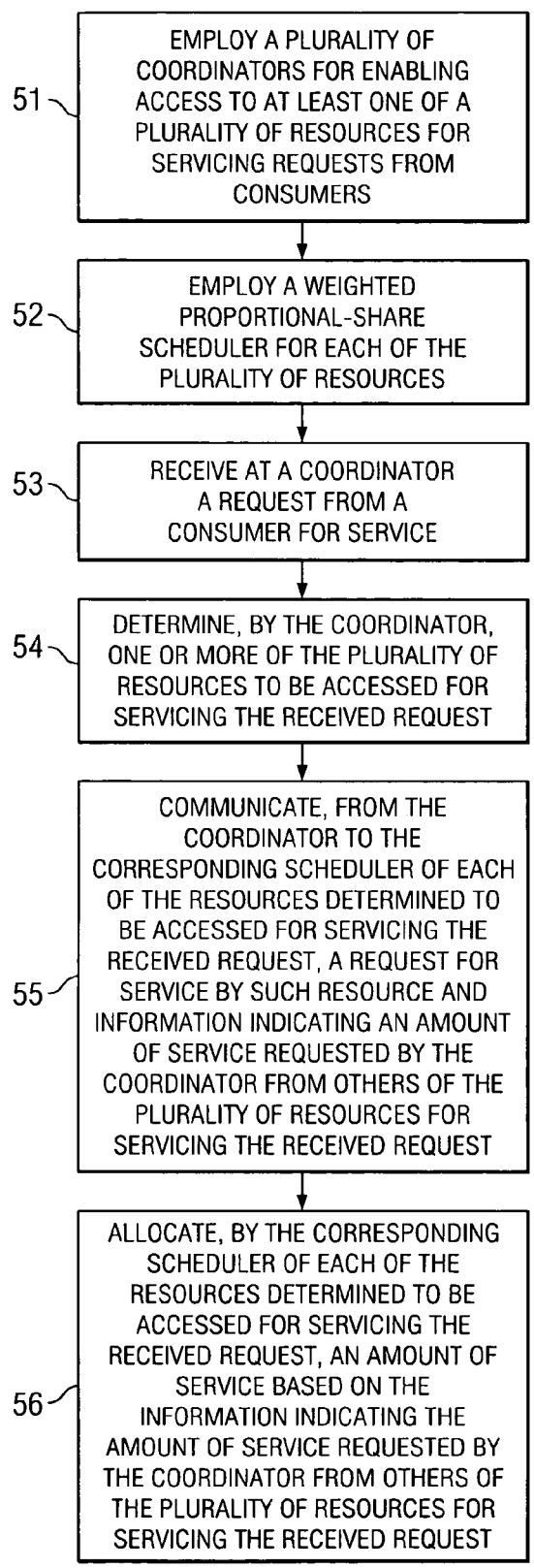
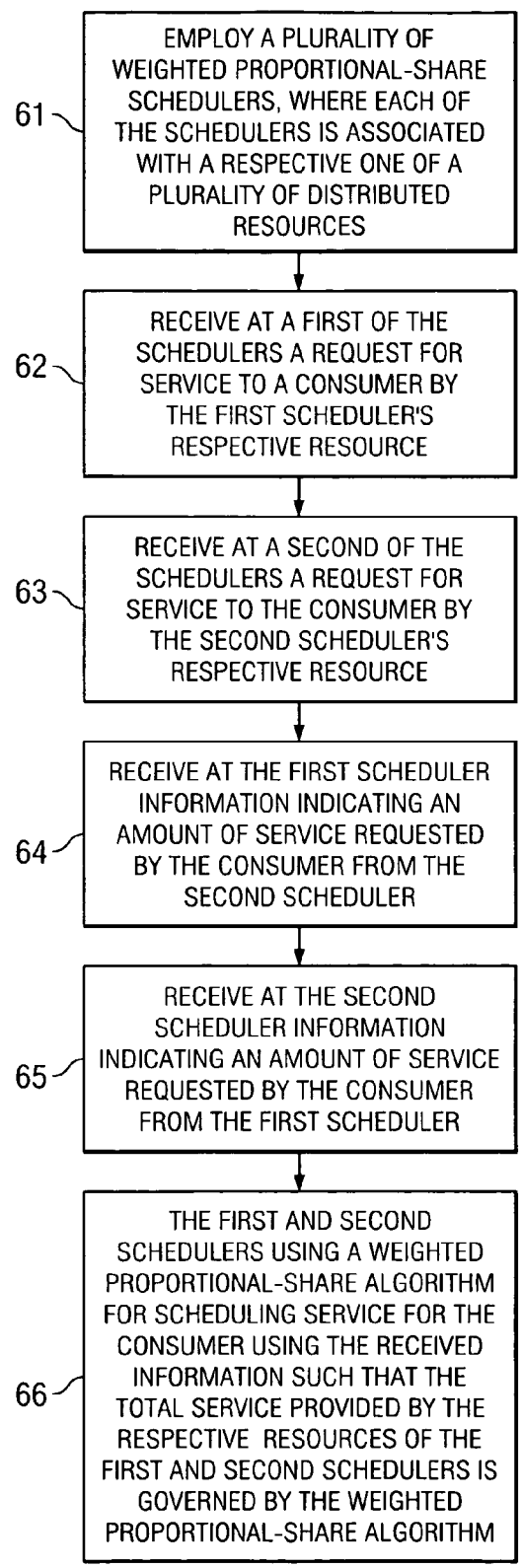

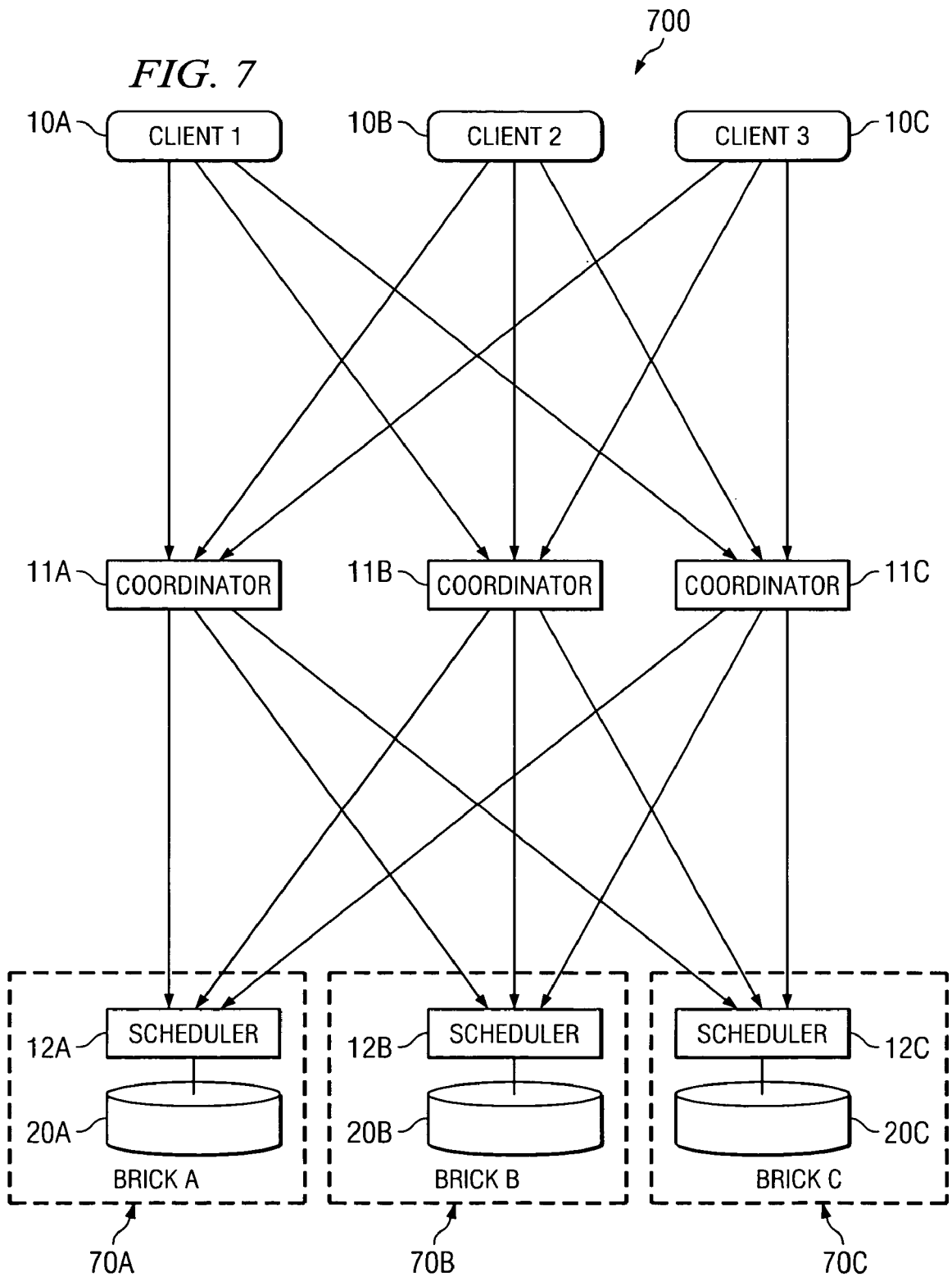

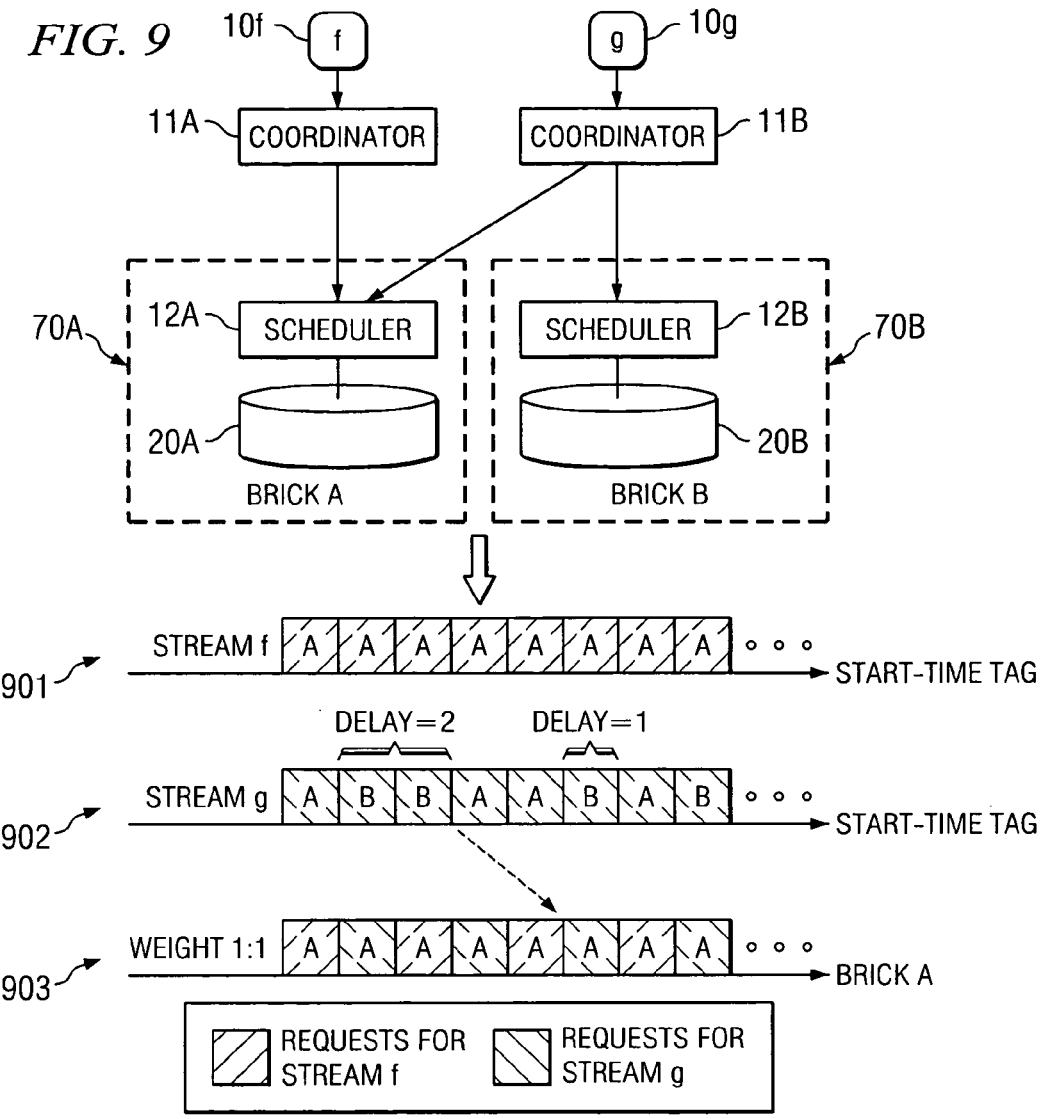

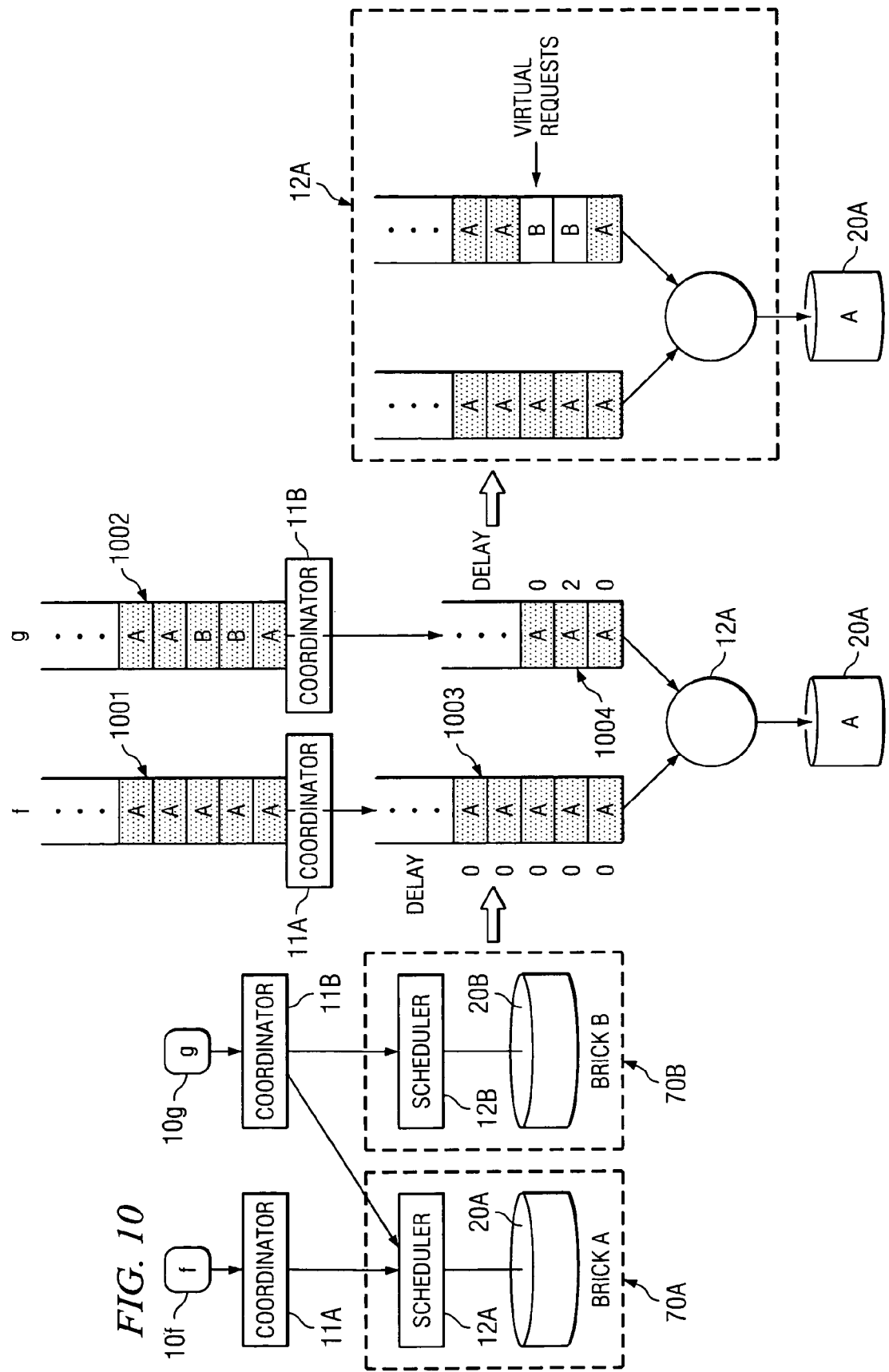

SYSTEM AND METHOD FOR PROVIDING, BY A PLURALITY OF SCHEDULERS, DIFFERENTIATED SERVICE TO CONSUMERS OF DISTRIBUTED RESOURCES

FIELD OF THE INVENTION

The following description relates generally to resource allocation, and more specifically to a system and method for allocating, by distributed schedulers, service by distributed resources to competing consumers according to a weighted proportional-share algorithm.

DESCRIPTION OF RELATED ART

Various systems exist in which allocation of resources are managed by a scheduling system. For instance, shares of resources may be allocated, by a scheduler, to various competing consumers (e.g., workloads) in attempt to satisfy performance goals of the consumers. That is, the consumers may be considered as "competing" because they all desire use of the resource, and the scheduler may allocate shares of utilization of such resource among the consumers. The scheduler may use some algorithm for determining an appropriate share of the resource to allocate to each consumer at any given time, such as a weighted proportional-share algorithm described further below. The performance goals of consumers, such as response time bounds and minimum throughput requirements, are typically expressed in the form of Service Level Agreements (SLAs). The performance level achieved by consumers may be controlled by varying the shares of resources available to each consumer. Proportional-share schedulers are known in the art for controlling the shares of resources that are allocated to consumers. Proportional-share schedulers are most commonly implemented using variants of Weighted Fair Queuing (WFQ). The use of WFQ schedulers for meeting SLAs is based on the premise that the performance of a workload varies in a predictable way with the amount of resources available to execute it.

WFQ schedulers have been used to ensure sharing of a computing resource or "service" (e.g., network link, CPU, file server, data storage, etc.) in proportion to an explicitly specified "weight" for each of the "flows" (or "consumers") that compete for the resource. In this regard, a "flow" refers to a sequence of tasks (network packets, instructions, I/O requests, etc.) that are using the shared resource(s). Because each flow desires use of the shared resource(s), a flow may be considered as a "resource consumer." Weights can be assigned to each consumer (e.g., each flow) to define respective priorities for allocating resource access among various competing consumers. Existing WFQ schedulers are "fair" in the sense that active flows share the available resource capacity proportionally to their weights, within some tolerance that is bounded by a constant over any time interval. Depending on the service desired, consumers (e.g., workloads) may compete for either physical resources (CPU cycles, disk I/O, network bandwidth, etc.) or virtual resources (web server bandwidth, database transactions per second, etc.), and the resources may be allocated by a WFQ scheduler to the competing consumers in proportion to the consumers' respective weights.

There are a number of known methods for performing proportional bandwidth sharing, i.e., maintaining the bandwidth between two backlogged workloads in proportion to their weights. Fair queuing methods, originally developed for network scheduling, are very popular. For example, YFQ, SFQ(D), and FSFQ(D) are scheduling algorithms that are based on start-time fair queuing, and SLEDS is a scheduling algorithm that uses a leaky bucket method. Jin et al. showed that when applying fair queuing algorithms to a storage system, the concurrent service capability of storage devices may result in arbitrary unfairness, and thus they developed SFQ (D) and FSFQ, variations of SFQ, to address this problem, see "Interposed proportional sharing for a storage service utility", *Proceedings of the International Conference on Measurement and Modeling of Computer Systems (SIGMETRICS)*, 2004.

Weighted proportional-share scheduling algorithms, such as those identified above, have been implemented by a centralized scheduler (or "centralized controller"). For instance, there are several projects that aim to provide differentiated service to clients in a storage system with a centralized scheduler, that is, where all the input/output ("IO") requests pass through some central point, which can then apply the algorithm to schedule service by the requested resource(s). A centralized scheduler can guarantee proportional sharing for each stream based on these priority queues, i.e., in proportion to the weights assigned to the competing streams.

Such traditional solutions have been insufficient for providing differentiated service to consumers being serviced by distributed resources. For instance, the requirement of a centralized scheduler creates a bottleneck. Thus, schedulers may be implemented for each of the distributed resources. However, while the schedulers may be used in above-described manner to maintain prioritization of service among competing consumers as to the schedulers' respective resource, the overall service provided to the competing consumers by the distributed resources is not maintained "fair" (i.e., in proportion to the competing consumers respective weights). Thus, the plurality of schedulers, while capable of using prior techniques for maintaining prioritization for their respective resources, are unable to maintain overall prioritization in proportion to weights assigned to the competing consumers. For example, suppose a first consumer makes a request for data from a first data storage resource, and the first consumer also makes a request for data from a second data storage resource. Further suppose that a second consumer makes a request for data from the first data storage resource. A first scheduler may be employed for scheduling the service of the requests made to the first data storage resource, and a second scheduler may be employed for scheduling the service of the requests made to the second data storage resource. The first scheduler may employ a weighted proportional-share algorithm for allocating shares of the first data storage resource to the first and second resources according to their respective weights. However, the first consumer, unbeknownst to the first scheduler, is also receiving service from the second data storage resource via the second scheduler. Therefore, the overall service obtained by the first and second consumers is not maintained in proportion to their respective weights by the distributed schedulers.

A recent paper by A. Gulati and P. Varman ("Lexicographic QoS scheduling for parallel I/O", in (SPAA), 2005) addresses multiple disks and distributed data. While this paper addresses the optimization problem of minimizing the unfairness among different clients, it proposes a solution that requires a centralized scheduler and the computation cost is undesirably high, which makes this solution impractical and/or unattractive for application to fully distributed high-performance systems. Also "Interposed proportional sharing for a storage service utility", *Proceedings of the International Conference on Measurement and Modeling of Computer Systems (SIGMETRICS)*, 2004, Jin et al. propose a decentralized scheduling algorithm, called RequestWindow ("RW"). Although the scheduler in RW is partly distributed, there is a point of centralization because there is only one server issuing windows. Also, RW is not fully work-conserving. In general, when a system is "work-conserving" a resource is never left idle when there is some request waiting that such resource can satisfied (i.e., resource capacity is not "reserved" for consumers that are not requesting use of such resource). Work-conserving is generally a desirable property in distributed high-performance systems.

In view of the above, a desire exists for an improved solution for providing differentiated service to consumers in a distributed system. That is, a desire exists for a system and method for providing differentiated service to consumers using distributed schedulers, wherein the schedulers manage servicing of requests to maintain an overall proportionality of service between the competing consumers according to weights assigned to such consumers. Of course, the system is preferably work-conserving, whereby the schedulers enforce such proportionality only when capacity of the resources for servicing all of the competing requests is exceeded.

BRIEF DESCRIPTION OF THE DRAWINGS

FIG. 3 shows an exemplary operational flow according to one embodiment of the present invention;

FIG. 4 shows an exemplary operational flow according to another embodiment of the present invention;

FIG. 5 shows an exemplary operational flow according to another embodiment of the present invention;

FIG. 6 shows an exemplary operational flow for a scheduler in accordance with one embodiment of the present invention;

FIG. 7 shows an exemplary Federated Array of Bricks ("FAB") system in which an embodiment of the present invention is be employed;

FIG. 9 shows an exemplary scenario in which streams of requests are received and a delay is added to the start time of certain requests to maintain overall service to the streams in proportion to their respective weights;

FIG. 10 shows another exemplary scenario for scheduling requests in a FAB system in accordance with one embodiment of the present invention; and FIG. 11 shows an exemplary scenario for scheduling requests in a FAB system in which each client accesses multiple coordinators in a round-robin fashion in accordance with one embodiment of the present invention.

DETAILED DESCRIPTION

As described further below, systems and methods for providing differentiated service to consumers being serviced by distributed resources are described. More specifically, systems and methods for providing differentiated service to consumers by a plurality of schedulers are described. According to certain embodiments herein, the plurality of schedulers are not required to communicate with each other in order to provide overall differentiated service to consumers in accordance with their respective assigned weights. Thus, efficiency can be enhanced and communication traffic required for implementing the solution is minimized (because the schedulers are not required to communicate with each other).

In certain embodiments, a solution for scheduling requests in a distributed storage system that guarantees each client service proportional to its assigned weight is provided, wherein the clients can access the data through one or more coordinators and the data may be distributed, without requiring communication between schedulers or coordinators. Of course, as described further herein, application of embodiments of the present invention is not limited to distributed storage systems, but may likewise be applied to systems having any resources for servicing consumers. For instance, depending on the service desired, consumers may compete for either physical distributed resources (CPU cycles, disk I/O, network bandwidth, etc.) or virtual distributed resources (web server bandwidth, database transactions per second, etc.), and embodiments of the present invention may be employed for efficiently scheduling service by the resources to competing consumers based on the consumers' respective weights.

Figure 1:
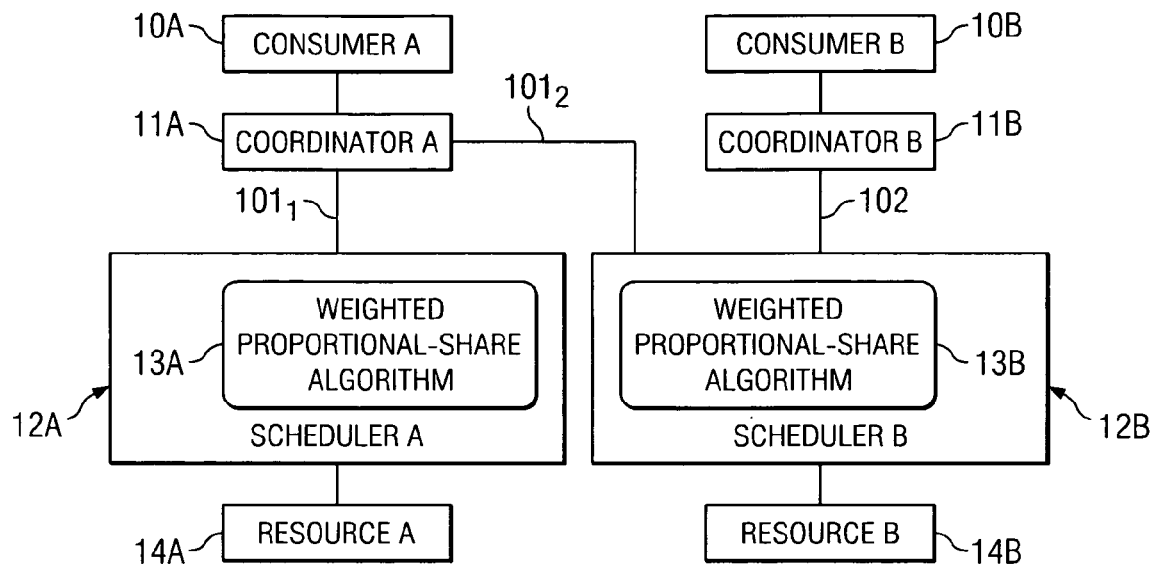
FIG. 1 shows an exemplary system according to one embodiment of the present invention.

FIG. 1 shows an exemplary system 100 according to one embodiment of the present invention. System 100 comprises consumers 10A and 10B, coordinators 11A and 11B, schedulers 12A and 12B, and resources 14A and 14B. Schedulers 12A and 12B comprise weighted proportional-share algorithms 13A and 13B, respectively. While this exemplary system 100 shows two consumers, two coordinators, two schedulers, and two resources, this is merely intended as a simple example for ease of illustration and discussion. Embodiments of the present invention are not limited in this regard, but may be applied to systems having any number of consumers, coordinators, schedulers, and resources. Further, while the number of consumers, coordinators, schedulers, and resources are all the same in the exemplary system 100 of FIG. 1 (i.e., two of each), in other embodiments different numbers of one or more (e.g., all) of these components may be employed in a given system. For instance, the number of consumers may differ from the number of coordinators, which may in turn differ from the number of schedulers, etc. that are implemented in a system.

Consumers 10A and 10B may be any entity in a system that is capable of requesting service by a resource, such as any process or flow, as examples. Resources 14A and 14B may comprise any resources that are accessible for servicing requests from consumers 10A and 10B. In certain embodiments, resources 14A and 14B are data storage resources, but they are not so limited. For instance, resources 14A and 14B may be computing resources (e.g., CPUs), network resources (e.g., network links), web servers, etc.

Coordinators 11A and 11B coordinate which one or more of resources 14A and 14B are to be used for servicing a given consumer request. For instance, in one embodiment, consumers 10A and 10B need not specify which ones of the plurality of resources 14A and 14B are to service the consumer's request, and in certain embodiments the consumers 10A and 10B may not even be aware of which of the plurality of resources 14A and 14B is capable of servicing its request. Further, in certain embodiments, consumers 10A and 10B may not even be aware that a plurality of resources 14A and 14B and/or a plurality of schedulers 12A and 12B exist, but rather coordinators 11A and 11B may make provide an appearance to the consumers 10A and 10B that a single resource with a corresponding scheduler exists.

Schedulers 12A and 12B schedule service by their respective resources 14A and 14B for servicing the consumers' requests. As described further herein, such schedulers 12A and 12B use weighted proportional-share algorithms 13A and 13B for scheduling service such that service is provided proportionally to weights assigned to the competing consumers. This proportionality is maintained for the total service that is provided to the consumers across the plurality of resources 14A and 14B. Thus, the schedulers do not simply maintain proportionality of service that is provided by their respective resource (i.e., "local proportionality"), but rather each scheduler manages the service provided by its respective resource such that overall proportionality (i.e., "global proportionality") of service is maintained in accordance with the weights assigned to the competing consumers. In one embodiment, the weighted proportional share algorithms 13A and 13B implement the DSFQ algorithm described further herein. Further, any of a plurality of different variants of the DSFQ algorithm may be employed, including without limitation the below described TOTAL-DSFQ, STRIPE-DSFQ, and Hybrid-DSFQ algorithms.

As described further herein, in certain embodiments, the plurality of schedulers 12A and 12B are capable of maintaining the total service that is provided to the consumers in proportion to the consumers' respective weights without requiring that the schedulers 12A and 12B communicate with each other. For instance, in certain embodiments, coordinators 11A and 11B communicate sufficient information to the schedulers regarding the overall requests for service that have been made for each consumer such that the schedulers can allocate the overall service by the resources 14A and 14B in proportion to the weights assigned to the consumers. Of course, the system 100 is preferably work-conserving, whereby the schedulers 12A and 12B enforce such proportionality only when capacity of the resources 14A and/or 14B for servicing all of the competing requests is exceeded.

FIG. 1 illustrates an exemplary scenario where consumer 10A communicates a request for service to coordinator 11A, and consumer 10B communicates a request for service to coordinator 11B. Coordinator 11A determines that consumer 10A's request requires service by resources 14A and 14B, while coordinator 11B determines that consumer 10B's request requires service only by resource 14B. Thus, because consumer 10A's request is determined as requiring service by both resources 14A and 14B, coordinator 11A sends a request for the service required for consumer 10A to schedulers 12A and 12B. As shown, coordinator 11A communicates request $101_1$ to scheduler 12A requesting service by resource 14A to consumer 10A, and coordinator 11A communicates request $101_2$ to scheduler 12B requesting service by resource 14B to consumer 10A. Coordinator 11B communicates request 102 to scheduler 12B requesting service by resource 14B to consumer 10B.

As described further herein, in certain embodiments of the present invention, the coordinators also communicate sufficient information to the schedulers regarding the overall requests for service that have been made for each consumer such that the schedulers can allocate the overall service by the resources 14A and 14B in proportion to the weights assigned to the consumers. For instance, in one embodiment, communication $101_1$ includes information informing scheduler 12A of the amount of service requested by coordinator 11A from resource 14B (via the request $101_2$ made to scheduler 12B). Likewise, communication $101_2$ includes information informing scheduler 12B of the amount of service requested by coordinator 11A from resource 14A (via the request $101_1$ made to scheduler 12A). Thus, schedulers 12A and, 12B are aware of the amount of service requested for a given consumer across the plurality of resources 14A and 14B. Further, the schedulers 12A and 12B are not required to communicate with each other in order to gain this information. Further still, in this example, the coordinators 11A and 11B are not required to communicate with each other. As described further herein, the weighted proportional-share algorithms 13A and 13B are operable to use this received information for maintaining the service provided by the plurality of distributed resources 14A and 14B proportional to the weights assigned to the competing consumers 10A and 10B. For instance, in one embodiment, a delay value is included in the information sent to a scheduler, where such delay value corresponds to the amount of service requested for the consumer from other scheduler(s). Thus, in this embodiment, the weighted proportional-share algorithm of each scheduler utilizes the received delay value in determining its allocation of service from its respective resource to the requesting consumer. As described further herein, the delay may indicate the amount of service requested by the coordinator for the consumer from other schedulers (e.g., as in the below-described TOTAL-DSFQ algorithm), an extrapolated proportion of service requested for this consumer from this scheduler relative to that requested for this consumer from other schedulers (e.g., as in the below-described STRIPE-DSFQ algorithm), or the delay may be determined by the coordinator as in the below-described Hybrid-DSFQ algorithm, as examples.

Figure 2:
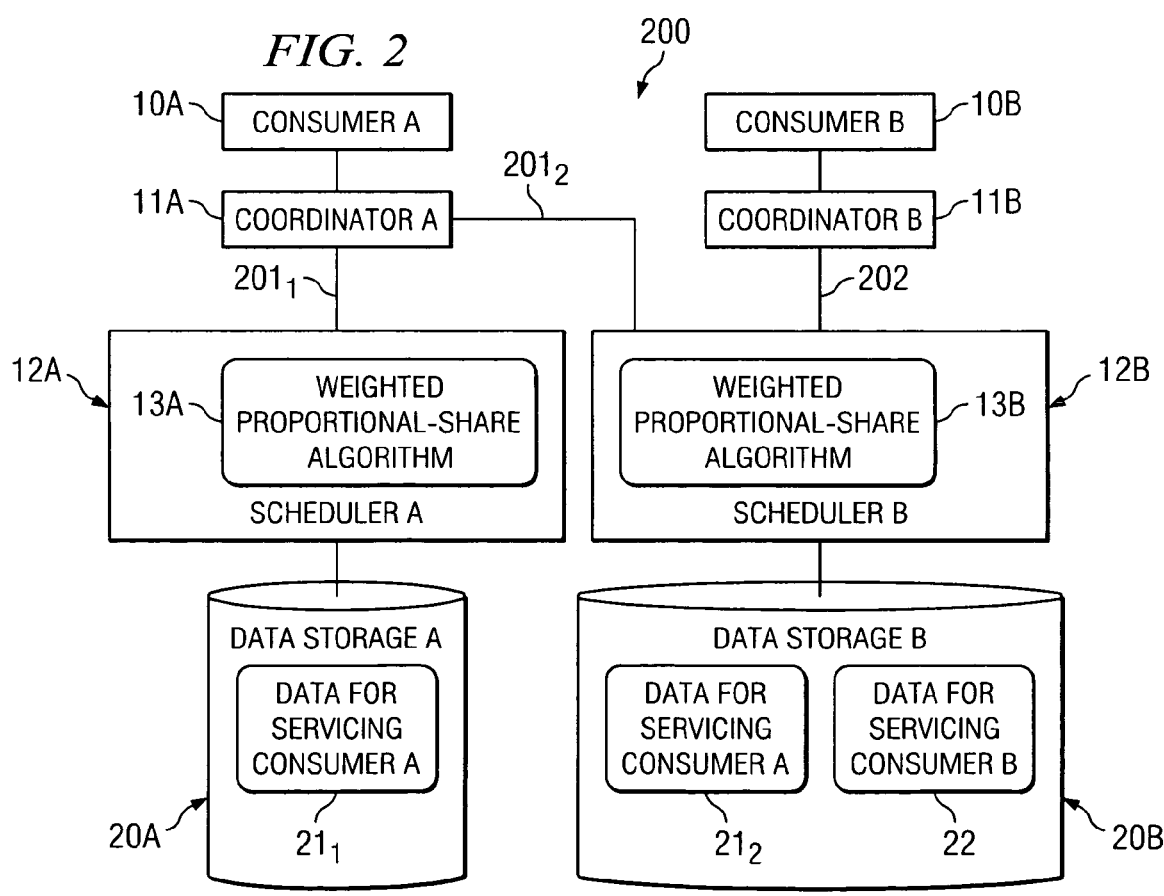
FIG. 2 shows another exemplary system according to one embodiment of the present invention.

Turning to FIG. 2, another exemplary system according to one embodiment of the present invention is shown. System 200 provides an example in which the distributed resources are data storage resources 20A and 20B. Such data storage resources may comprise any suitable data storage devices now known or later discovered that are operable for storing digital information, including without limitation hard disks, optical disk drives, tape drives, magnetic data storage drives, databases, file servers, memory, etc. Further, the data storage resources 20A and 20B need not be the same type in certain embodiments (e.g., data storage resource 20A may be a hard disk, while data storage resource 20B may be an optical disk drive).

FIG. 2 illustrates an exemplary scenario where consumer 10A communicates a request for service to coordinator 11A, and consumer 10B communicates a request for service to coordinator 1B. In this example, consumers 10A and 10B each requests access to data. Coordinator 11A determines that consumer 10A's request requires service by data storage resources 20A and 20B. That is, coordinator 11A determines that consumer 10A is requesting data $21_1$ and $21_2$, which are stored to data storage resources 20A and 20B, respectively. Coordinator 11B determines that consumer 10B's request requires service only by resource 14B. That is, coordinator 11B determines that consumer 10B is requesting data 22 that is stored to data storage resource 20B.

Thus, because consumer 10A's request is determined as requiring data to be served by both data storage resources 20A and 20B, coordinator 11A sends a request for the service required for consumer 10A to schedulers 12A and 12B. As shown, coordinator 11A communicates request $201_1$ to scheduler 12A requesting data $21_1$ from data storage resource 20A to be served to consumer 10A, and coordinator 11A communicates request $201_2$ to scheduler 12B requesting data $21_2$ from data storage resource 20B to be served to consumer 10A. Coordinator 11B communicates request 202 to scheduler 12B requesting data 22 from data storage resource 20B to be served to consumer 10B.

As described further herein, in certain embodiments of the present invention, the coordinators also communicate information to the schedulers indicating a delay that corresponds in some way to service requested by such coordinators for a given consumer from the other schedulers. For instance, in one embodiment, communication $201_1$ includes information informing scheduler 12A of the request $201_2$ for data $21_2$ made by coordinator 11A to data storage resource 20B for consumer 10A. Likewise, communication $201_2$ includes information informing scheduler 12B of the request $201_1$ for data 21 made by coordinator 11A to data storage resource 20A for consumer 10A. Thus, schedulers 12A and 12B are aware of the amount of service requested for a given consumer across the plurality of data storage resources 20A and 20B. As described farther herein, the weighted proportional-share algorithms 13A and 13B are operable to use this received information for maintaining the service provided by the plurality of distributed data storage resources 20A and 20B proportional to the weights assigned to the competing consumers 10A and 10B. Again, in certain embodiments a delay value is included in the information provided from a coordinator to a scheduler, wherein the delay value corresponds to the service requested by such coordinator for the consumer from other scheduler(s).

Turning to FIG. 3, an exemplary operational flow according to one embodiment of the present invention is shown. In operational block 301, a first weight is assigned to a first consumer, and a second weight is assigned to a second consumer. In block 302, a first scheduler receives a request for service by a first resource to a first consumer. For instance, in the example of FIG. 1, scheduler 12A receives (from coordinator 11A) a request for service by resource 14A to consumer 10A. In block 303, a second scheduler receives a request for service by a second resource to the first consumer. For instance, in the example of FIG. 1, scheduler 12B receives (from coordinator 11A) a request for service by resource 14B to consumer 10A. In block 304, the first scheduler receives a request for service by the first resource to the second consumer. In block 305, the first and second schedulers schedule service from the first and second resources to the first and second consumers. The scheduling of block 305 maintains total service provided by the first and second resources to the first and second consumers in proportion to the respective weights of the first and second consumers, without requiring the first and second schedulers to communicate with each other.

Turning to FIG. 4, an exemplary operational flow according to another embodiment of the present invention is shown. In operational block 41, a first weight is assigned to a first consumer, and a second weight is assigned to a second consumer. In block 42, a first coordinator receives a request from the first consumer for service. In block 43, the first coordinator determines at least one of a plurality of resources for providing the requested service to the first consumer. In block 44, a second coordinator receives a request from the second consumer for service. In block 45, the second coordinator determines at least one of the plurality of resources for providing the requested service to the second consumer. In block 46, overall service by the at least one resource is scheduled for the first and second consumers in proportion to the respective weights of the first and second consumers without requiring the first and second coordinators to communicate with each other.

As described further herein, the resource used for servicing the consumers may comprise a plurality of distributed resources, such as the plurality of distributed data storage resources 20A and 20B shown in the exemplary system of FIG. 2. Thus, according to certain embodiments of the present invention, proportionality can be maintained for servicing consumers without requiring that coordinators communicate with each other. As described further herein, in certain embodiments, a plurality of schedulers are also employed, wherein the schedulers schedule service in a manner that enforces the proportionality of weights assigned to the competing consumers. Further, such schedulers are not required to communicate with each other in order to enforce such proportionality.

FIG. 5 shows an exemplary operational flow according to another embodiment of the present invention. In operational block 51, a plurality of coordinators are employed for enabling access to at least one of a plurality of resources for servicing requests from consumers, such as coordinators 11A and 11B for servicing requests from consumers 10A and 10B in the example of FIG. 1. In block 52, a weighted proportional-share scheduler is employed for each of said plurality of resources, such as schedulers 12A and 12B for resources 14A and 14B in the example of FIG. 1. In block 53, a coordinator receives a request from a consumer for service. In block 54, the coordinator determines one or more of the plurality of resources to be accessed for servicing the received request. For instance, in the example of FIG. 1, coordinator 11A receives a request for service from consumer 10A, and coordinator 11A determines that resources 14A and 14B are to be accessed for servicing consumer 10A's request. In block 55, the coordinator communicates to the corresponding scheduler of each of the resources to be used, a request for service and information indicating an amount of service requested by the coordinator from others of the plurality of schedulers for servicing the received request. Such information that indicates an "amount" of service requested from other schedulers may be an actual amount of service requested (as in the TOTAL-DSFQ algorithm), it may be an extrapolated amount (as in the STRIPE-DSFQ algorithm) or it may be some other amount that corresponds in some way to the amount of service requested for this consumer from other schedulers. For instance, in the example of FIG. 1, coordinator 11A communicates $101_1$ a request to scheduler 12A for service by resource 14A, which includes information notifying scheduler 12A of the requested service made by communication $101_2$ from coordinator 11A to scheduler 12B for service by resource 14B. In block 56, the corresponding scheduler of each of the one or more resources determined to be accessed allocates an amount of service based on the information indicating the amount of service requested by the coordinator from others of the plurality of resources for servicing the received request.

Accordingly, in certain embodiments, distributed schedulers provide service to consumers in accordance with a weighted proportional-share scheduling algorithm. FIG. 6 shows an exemplary operational flow for a scheduler in accordance with one embodiment of the present invention. In operational block 61, a plurality of weighted proportional-share schedulers are employed, where each of the schedulers is associated with a respective one of a plurality of distributed resources. In block 62, a first of the schedulers receives a request for service to a consumer by the first scheduler's respective resource. In block 63, a second of the schedulers receives a request for service to the consumer by the second scheduler's respective resource. For instance, in the example illustrated in FIG. 1, scheduler 12A receives (from coordinator 11A) a request for service to be provided by its resource 14A to consumer 10A, while scheduler 12B receives (from coordinator 11B) a request for service to be provided by its resource 14B to consumer 10A.

In block 64, the first scheduler receives information indicating an amount of service requested by the consumer from the second scheduler, and in block 65, the second scheduler receives information indicating an amount of service requested by the consumer from the first scheduler. Again, this information indicating an amount may provide an actual amount, an extrapolated amount, or other amount that in some way corresponds to the service requested for the consumer. For instance, in the example of FIG. 1, scheduler 12A receives information $101_1$ that indicates an amount of service requested (via request $101_2$) from scheduler 12B for servicing consumer 10A. Likewise, scheduler 12B receives information $101_2$ that indicates an amount of service requested (via request $101_1$) from scheduler 12A for servicing consumer 10A. In block 66, the first and second schedulers use a weighted proportional-share algorithm for scheduling service for the consumer using the received information such that the total service provided by the respective resources of the first and second schedulers is governed by the weighted proportional-share algorithm.

As discussed above, schedulers 12A and 12B utilize weighted proportional-share scheduling algorithms 13A and 13B, respectively. According to one embodiment, such algorithm is an adaptation of the known Start-time Fair Queuing (SFQ) algorithm. For instance, in one embodiment, the scheduling algorithm enforces an extra delay on scheduling each request. Different performance guarantees can be met by different delay functions. The delay functions can be calculated at coordinators locally so communication among schedulers is avoided.

Before discussing exemplary embodiments of the present invention further, it is helpful to provide a brief description of traditional weighted proportional-share scheduling algorithms, such as SFQ(D). In SFQ(D) (as in SFQ) each job or IO request is assigned a Start-time tag and a Finish-time tag, and there is a global virtual time that is initially set to zero. The Start-time tag of each request is set to the virtual-time at its arrival or the finish-time tag of the previous job from this client, whichever is larger. The finish time tag of each request is set to the start time plus the cost of the request (say, its size in bytes if we are trying to do a proportional sharing of the bandwidth (bytes/second) received by each client) divided by the weight assigned to the client. Virtual time is set to be the start-time tag of the request in service. At the end of each request, the request with the smallest start-time tag is added to the execution queue. If requests from all clients pass through this controller, it is guaranteed that the service they receive will be in proportion to their weights so long as there are enough requests to serve from each client. Fair queuing algorithms are discussed further hereafter.

According to one embodiment of the present invention, a scheduling algorithm (e.g., the DSFQ algorithm described further below) is proposed. This algorithm is based on fair queuing, which refers to a class of scheduling algorithms to allocate resources among competing consumers. Many variants of fair queuing exist for different purposes. Consider the following: each stream f has a sequence of requests $p_f^0 \ldots p_f^n$ arriving at the server. A request $p_f^j$ has an associated cost $c_f^j$. For example, if bandwidth sharing is the interest, the cost might be the size of the package; and if the interest is the scheduling of CPU time, the predicted service time of a request might be a good choice for the cost. Fair queuing allocates the capacity of the resource in proportion to weights assigned to the competing consumers.

A stream is considered "active" if it has one or more requests in process or queued. The stream is considered "backlogged" if it has requests queued. Fair queuing algorithms are work-conserving, i.e. there are no surplus resources if some stream is backlogged.

Formally, if $W_f(t_1, t_2)$ is the aggregate cost of the requests from stream f served in the time interval $[t_1, t_2]$, then a fair scheduling algorithm guarantees that:

$$\left| \frac{W_f(t_1, t_2)}{\phi_f} - \frac{W_g(t_1, t_2)}{\phi_g} \right| \leq H_{f,g} \quad (1)$$

where f and g are any two streams continuously backlogged with requests during $[t_1, t_2]$, and $H_{f,g}$ is a constant that depends on the stream and system characteristics, e.g., maximum cost $c_f^{max}$ of a request. $\phi_f$ and $\phi_g$ refer to the weights assigned to streams f and g, respectively.

Depending on how the cost is defined in a given system, predicting it may be difficult. It should be understood, however, that known techniques exist for determining such cost, and any technique now known or later discovered may be used in accordance with embodiments of the present invention. For example, the cost of a storage service request may be affected by cache hits, disk scheduling, sequential/random access, etc. This feature of storage service requests narrows the choice of fair queuing algorithms or other scheduling algorithms.

The Virtual Clock (VC) algorithm is a known fair queuing algorithm, which works as follows. Each stream or workload f maintains a Virtual Clock $VC_f$. Initially, $VC_f$ equals the real time. When the $j^{th}$ request $p_f^j$ of stream f arrives, $VC_f$ is updated as follows:

$$VC_f \leftarrow VC_f + \frac{c_f^j}{\phi_f} \quad (2)$$

where $c_f^j$ is the cost of request $p_f^j$ to be served (assume it is proportional to the service time), and $\phi_f$ is the weight assigned to stream f. Every request of a stream is stamped with its current VC value and the server serves requests in the order of increasing stamp values.

If the $VC_f$ lags behind the real time because stream f is inactive, the VC algorithm synchronizes VC with the real time. If two streams f and g start with the same VC value, the VC algorithm guarantees proportional sharing according to formula (1) above between f and g as long as they are both backlogged. However, if g is temporarily inactive and f is served faster, $VC_f$ can be arbitrarily ahead of the real time and f cannot receive any service later on when g becomes active again. So, a drawback of the VC algorithm for certain systems is that a stream is punished heavily for consuming idle resource, resulting in unfairness.

Start-time Fair Queuing (SFQ) is another known fair queuing algorithm, which overcomes the above problem of the VC algorithm by synchronizing the virtual clock at each stream, i.e., there is only one global virtual clock, called Virtual Time v(t). Formally, SFQ works as follows. It assigns two tags for every request: when the $j^{th}$ request $p_f^j$ of stream f arrives, it is assigned a start tag $S(p_f^j)$ and a finish tag $F(p_f^j)$. The tag values represent the time at which each request should start and complete according to a system notion of virtual time v(t). Virtual time always advances monotonically and is approximately equal to real time under ideal conditions: all streams are backlogged, the server completes work at a fixed ideal rate, request costs are accurate, and the weights sum to the service capacity. In practice, virtual time may diverge arbitrarily from real time without compromising fairness if the scheduler dispatches requests in virtual time order. For example, v(t) advances faster than real time whenever surplus resources allow the active streams to receive service at a faster rate than their configured shares would allow.

SFQ assigns tags as follows:

$$S(p_f^j) = \max\{v(A(p_f^j)), F(p_f^{j-1})\}, j \geq 1 \quad (3)$$

$$F(p_f^j) = S(p_f^j) + \frac{c_f^j}{\phi_f}, j \geq 1 \quad (4)$$

where $A(p_f^j)$ is the actual arrival time of request $p_f^j$, $F(p_f^0)=0$, $v(0)=0$. Again, $\phi_f$ is the weight assigned to stream f. During a busy period, $v(t)$ is defined to be equal to the start tag of the request in service at time t. When the server is idle, $v(t)$ is defined to be equal to the maximum finish tag of any request that has been serviced by time t. A key advantage of SFQ is that it determines $v(t)$ efficiently.

The following theorem has been derived for SFQ:

Theorem 1 For any interval $[t_1, t_2]$ in which streams f and g are backlogged during the entire interval.

$$\left|\frac{W_f(t_1, t_2)}{\phi_f} - \frac{W_g(t_1, t_2)}{\phi_g}\right| \leq \frac{c_f^{max}}{\phi_g} + \frac{c_g^{max}}{\phi_g} \quad (5)$$

where $W_f(t_1, t_2)$ is the aggregate cost of requests served from stream f in the interval $[t_1, t_2]$.

SFQ and other fair queuing algorithms are similar to the VC algorithm in that the request tags for each stream advance according to the progress of that stream. The start tag of the stream's most recent request may be viewed as the stream's virtual clock. Flows with smaller tag values are "behind" and receive priority for service; streams with larger tag values are "ahead" and may be penalized. However, unlike the VC algorithm, the tag values of newly active streams advance to the global virtual clock $v(t)$ in the SFQ algorithm, so that their newly arriving requests compete fairly with other active streams. This avoids unfairly penalizing active streams for consuming surplus resources left idle by inactive streams.

If there is no global Virtual Time $v(t)$, SFQ degrades to the VC algorithm, which can be arbitrarily unfair. However, the idea of maintaining locally at each stream may be preferable in a distributed system, where global synchronization of virtual time is impossible or computationally expensive.

Another fair queuing algorithm that is known is SFQ(D), which guarantees proportional sharing of the service with a bound that is a function of the queue depth D. SFQ(D) is described further below. SFQ is attractive to performance guarantees in storage systems in part because it is fair even with fluctuating service capacity. However, the virtual time $v(t)$ is not well-defined in this setting because of internal concurrency of storage servers, i.e., it may have multiple requests in service simultaneously in order to maximize the utilization of disks. Jin et al. pointed out (in "Interposed proportional sharing for a storage service utility", in *Proceedings of the International Conference on Measurement and Modeling of Computer Systems (SIGMETRICS)*, 2004) that if $v(t)$ is defined to be equal to the minimum start tag of requests in service (Min-SFQ), it can be arbitrarily unfair. The reason is that an active stream may hold back the virtual time $v(t)$ if it generates an insufficient number of concurrent requests to consume its assigned share.

Instead, one can define the virtual time as the start-time tag of the last request dispatched to the disk, i.e., the queued request with the lowest start tag at the time of the last dispatch. Arriving requests are assigned start and finish tags according to Equations (3) and (4) above. The resulting algorithm is known as depth-controlled start-time fair queuing (SFQ(D)), a variation of SFQ. D here means the queue depth at the server, i.e., number of outstanding requests. The fairness guarantee of SFQ(D) is proved by the following theorem:

Theorem 2 During any interval $[t_1, t_2]$, the difference between the amount of work completed by an SFQ(D) server for two backlogged streams f and g is bounded by:

$$\left|\frac{W_f(t_1, t_2)}{\phi_f} - \frac{W_g(t_1, t_2)}{\phi_g}\right| \leq (D+1) * \left(\frac{c_f^{max}}{\phi_f} + \frac{c_g^{max}}{\phi_g}\right) \quad (6)$$

A more complicated algorithm, called FSFQ(D), is presented by Jin et al. in "Interposed proportional sharing for a storage service utility", *Proceedings of the International Conference on Measurement and Modeling of Computer Systems (SIGMETRICS)*, 2004, the disclosure of which is hereby incorporated herein by reference. One embodiment of a scheduling algorithm used in the present invention is described below as based on the SFQ(D) algorithm. However, in other embodiments, such scheduling algorithm may instead be based on another fair queuing algorithm now known or later developed, including without limitation the FSFQ(D) algorithm.

According to one embodiment, a weighted proportional-share scheduling algorithm referred to as DSFQ is employed by the schedulers. DSFQ is an extension of the SFQ(D) algorithm that has been proposed for a centralized controller. DSFQ is described further hereafter with reference to an exemplary distributed storage system, shown in FIG. 7. Of course, it should be understood that reference to such distributed storage system is merely for ease of discussion, and application of the DSFQ scheduling algorithm is not limited to the exemplary system of FIG. 7 but may likewise be applied to other systems for scheduling resources (which may be resources other than data storage resources). Before describing the DSFQ algorithm, the exemplary distributed storage system 700 of FIG. 7 is briefly described.

One embodiment of the present invention is employed for use on a Federated Array of Bricks (FAB). The FAB system is generally built from commodity hardware. It utilizes a number of individual storage nodes, or "bricks," to present a single, highly-available, storage store. An exemplary FAB system 700 is shown in FIG. 7. Such FAB system 700 is an example of a distributed storage system. System 700 comprises symmetrical bricks 70A, 70B, and 70C. Each brick may run the same set of software modules and manage the same types of data structures. In the example of FIG. 7, bricks 70A, 70B, and 70C comprise data storage 20A, 20B, and 20C, respectively. Further, bricks 70A, 70B, and 70C comprise schedulers 12A, 12B, and 12C, respectively, which schedule service to requests by their respective data storage. Clients 10A, 10B, and 10C are operable to request service by submitting requests to coordinators 11A, 11B, and 11C. In certain embodiments, each client may always submit requests via a single coordinator. It is not necessary that each client use a different coordinator from all other clients, but certain systems may be implemented such that each client always makes requests for service to one coordinator. For instance, client 10A may submit all of its requests to coordinator 11A, client 10B may submit all of its requests to coordinator 11B, and client 11C may likewise submit all of its requests to coordinator 11B. As discussed further herein, in certain embodiments, each client may submit requests to any of the coordinators 11A-11C, and may submit different requests to different ones of the coordinators.

While the coordinators 11A-11C are shown in this example as being external to bricks 70A-70C, in certain embodiments a brick may act both as a storage center and a coordinator, i.e., a gateway for the request. In other words, in certain embodiments, coordinators 11A-11C may be implemented on bricks 70A-70C, respectively. In this exemplary architecture of system 700, different requests, even from the same client, can be coordinated by different bricks. It should be recognized that in this exemplary system 700 coordinators 11A-11C are distributed. A coordinator schedules requests possibly without the knowledge of requests sent to other coordinators. Also, the data is distributed. A logical volume in a distributed storage system might be replicated or erasure-coded across many bricks. Requests from a client could possibly spread on different bricks. An embodiment of the present invention provides a distributed scheduler framework that can provide service guarantees regardless of the data layout.

According to this exemplary embodiment, a distributed proportional sharing algorithm (e.g., the DSFQ algorithm described below) is utilized by the schedulers. With proportional sharing, the system reserves for each flow some specified minimum share of the server's capacity to handle requests, encoded as a weight. Surplus resources are shared among active flows in proportion to their shares. The service capacity to be proportionally shared could be throughput or service time, as examples. Taking into account that the data is distributed, the algorithm of this exemplary embodiment allows total service capacity proportional sharing, local brick proportional sharing, or mixed sharing.

Thus, the scheduling algorithms are employed on distributed schedulers in this architecture, rather than utilizing a centralized scheduler. The data assessed by the clients is distributed over some number of back-end storage servers (bricks); each client accesses the data through some number of coordinators that know where the data is stored and can retrieve the data for the request on behalf of the client. However, if the back-end bricks were to schedule the requests using the standard SFQ(D) scheduler, it would not take into account the service that the flow receives at other bricks, and this would result in sharing the local resources proportionately, rather than total proportional sharing. FIG. 9 shows that in order to achieve total proportional resource sharing between streams f (901) and g (902), where stream g receives service from bricks A and B, the scheduler 12A for brick A (70A) adds an extra delay to the start time of requests from stream g corresponding to the amount of service g has received from brick B, as shown in the resulting stream 903 for Brick A. In this exemplary embodiment, the coordinator computes a delay for each request based on its cost and on other information it has, and passes it to the brick along with the request.

In one embodiment, each back-end brick runs an SFQ(D) scheduler (e.g., schedulers 12A-12C in FIG. 7) for the requests it serves, but adds the supplied delay to the finish-time tag of the previous request from this client in computing the start-time tag. An example of this is illustrated in FIG. 10, where coordinator 11A receives requests 1001 from flow f, and coordinator 11B receives requests 1002 from flow g. Coordinator 11A computes the delay for each request from flow f, resulting in the requests with accompanying delay information 1003 for flow f, which is communicated to scheduler 12A of brick 70A. Coordinator 11B computes the delay for each request from flow g, resulting in the requests with accompanying delay information 1004 for flow g, which is communicated to scheduler 12A of brick 70A. As shown in FIG. 10, this can be thought of as adding to the stream of requests sent to brick A all the requests sent to brick B as well; these additional requests would act as "virtual requests" at brick A, consuming no resources but taken into account for the scheduling of the requests actually intended for brick A.

Figure 8:
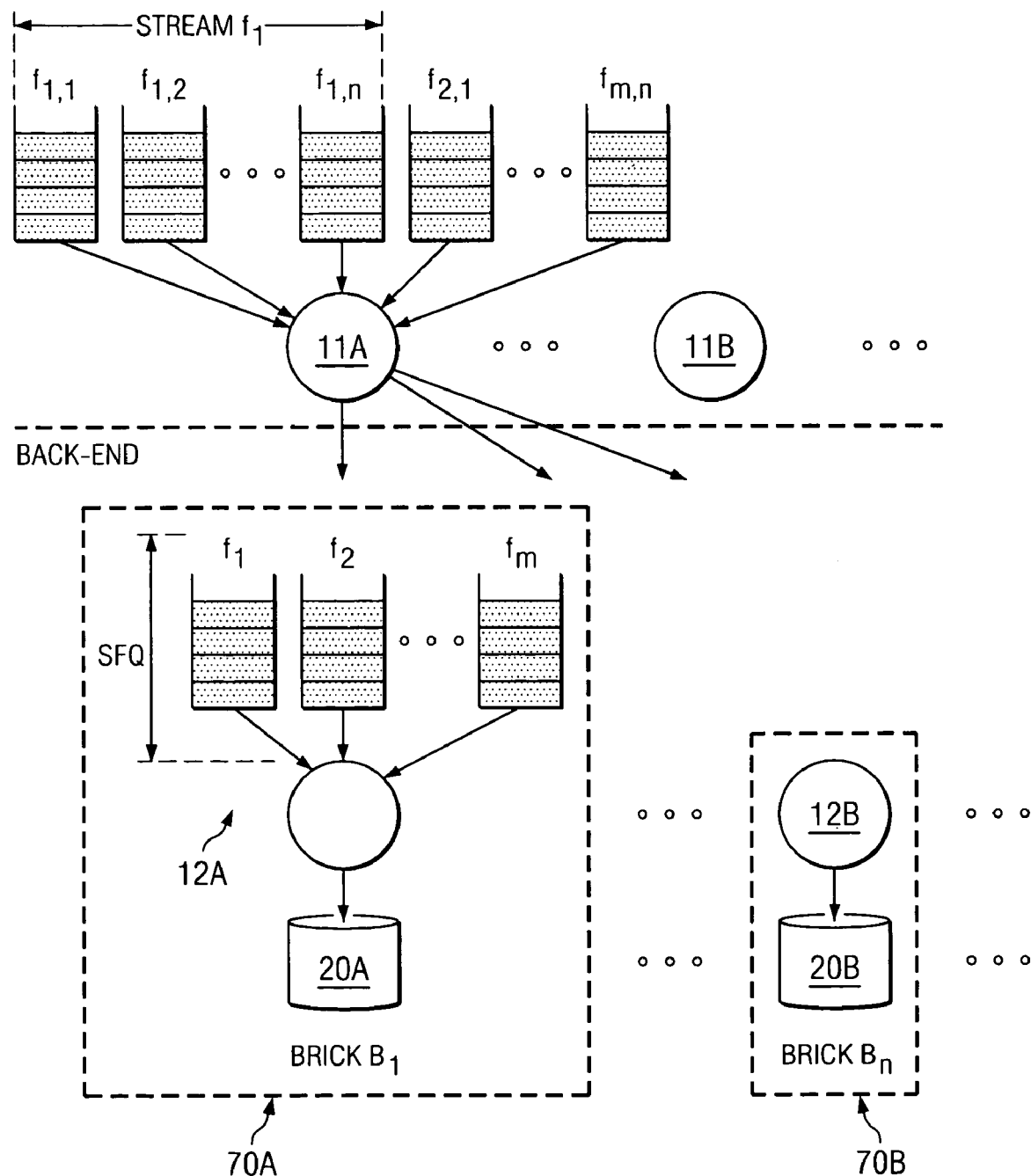
FIG. 8 shows an exemplary implementation of the FAB system of FIG. 7 having n bricks with m streams.

In one embodiment, each of the schedulers 12A-12C are running the DSFQ algorithm, which is now described with reference to FIG. 8. FIG. 8 shows an exemplary implementation of the FAB system 700 of FIG. 7, wherein there are n bricks $B_1, B_2, \ldots, B_n$ and m clients or streams $f_1, f_2, \ldots, f_m$. In this example, brick $B_1$ is shown as brick 70A of FIG. 7, and brick $B_n$ is shown as brick 70B of FIG. 7. Each back-end brick has m queues for the m streams. The scheduler (e.g., scheduler 12A of brick 70A) dispatches requests to the brick's data storage resource (e.g., disk) in the order of some priority, e.g., start-time tag in the case of SFQ. Each coordinator has mn FIFO queues, one for every (stream, brick) pair. The coordinator dispatches a request in queue $f_{i,j}$ to queue $f_i$ at brick $B_j$ immediately once $f_i$ has an empty spot.

It can be seen that if SFQ(D) is implemented at each scheduler of this architecture, it guarantees individual brick proportional sharing. In terms of total service proportional sharing, a brick has to discount the service rate of a stream that is requesting service at other bricks simultaneously. This concept can be integrated into the SFQ algorithm with a delay function that delays the start-time tag of a request, as discussed below.

If the ith request of stream f, $p_f^i$ is serviced at brick A, and it is the jth request of f on A, rename it as $p_{f,A}^j$. The cost of request $p_{f,A}^j$, denoted as $c_{f,A}^j$, is the same as $c_f^j$. The back-end (e.g., brick or scheduler of a brick) maintains a Virtual Time $v(t)$ and a Start-time Fair Queue. The Distributed Start-time Fair Queuing (DSFQ) algorithm is summarized as follows:

$$S(p_{f,A}^j) = \max\left\{v_A(A(p_{f,A}^j)), \right. \quad (7)$$

$$\left. F(p_{f,A}^{j-1}) + \frac{\text{Delay}(p_{f,A}^j)}{\phi_f}\right\}$$

$$F(p_{f,A}^j) = S(p_{f,A}^j) + \frac{c_{f,A}^j}{\phi_f} \quad (8)$$

where $A(p_{f,A}^j)$ is the actual arrival time at the scheduler for brick A of request $p_{f,A}^j$, $F(p_{f,A}^0)=0$, $v_A(0)=0$. Again, $\phi_f$ is the weight assigned to stream f. In this embodiment, each brick's scheduler dispatches requests in increasing order by their start-time tags. $v_A(t)$ is defined to be equal to the start-time tag of the last request dispatched to the data storage resource (e.g., disk) before or at a time t. It should be noted that this is the same as SFQ(D). $v(t)$ is not defined in SFQ when the server has concurrent service capability. However, we refer to the above embodiment of the distributed scheduling algorithm as DSFQ instead of DSFQ(D) for simplicity. If the delay function is always zero, DSFQ degenerates to SFQ(D).

Depending upon how the coordinator computes the delay, different proportionality properties can be enforced. Let us first assume requests from one stream is always processed by a fixed coordinator. Different streams may have different coordinators and a stream may request service at different bricks simultaneously. The performance goal is that the total amount of service each client receives should be proportional to the client's respective weight.

If $p_f^i$ is the ith request of stream f and is the jth request of stream f that requests service on brick A, function index $(p_{f,A}^j)$ returns i as $p_{f,A}^j$'s global index of stream f. The delay function that guarantees total service proportional sharing is as follows.

$$\text{Delay}(p_{f,A}^j) = \sum_{i=\text{index}(p_{f,A}^{j-1})+1}^{\text{index}(p_{f,A}^j)-1} c_f^i \qquad (9)$$

The exemplary scheduling algorithm defined by formulae (7-9) is a distributed start-time fair queuing algorithm with respect to total service capacity, called TOTAL-DSFQ.

The delay function (9) provides that the amount of delay at one brick equals the total service cost of requests sent to other bricks since the last request on this brick. Thus, a request on brick A should be delayed by a duration proportional to the service its stream is receiving on other bricks.

In the above discussion of the exemplary DSFQ algorithm, we have assumed that a stream requests service through one coordinator only. This is not true in some high-end storage systems, where concurrency at the coordinator level is necessary for high performance. Thus, as discussed below, certain embodiments of the present invention allow for a single-client multi-coordinator setting. As discussed further below, the above-described DSFQ algorithm works for maintaining sufficient fairness when the client's access the multiple coordinators in some regular fashion, such as a round-robin sequence of accesses, as opposed to accessing them in an arbitrary or random fashion.

First, let us assume that each client accesses multiple coordinators in a round-robin fashion, and let us examine the effect of delay function (9) under this setting. FIG. 11 is an example. FIG. 11 shows an exemplary stream f 1101, which makes requests to bricks A-E in the order shown. Supposing each request has unit cost, with one coordinator, delay of the four requests to brick A are 9, 2, 2 and 0, as shown in stream 1102. With two round-robin coordinators on the other hand, delay of two requests dispatched by one coordinator is 0 and 2, delay of the other two requests dispatched by another coordinator is 1 and 1, as shown by streams 1103. Therefore, delay of individual requests has changed, but the total amount remains the same. If we reorder the virtual stream as stream 1104 of FIG. 11, at brick A, the requests received from two coordinators look exactly the same as the reordered virtual stream dispatched by one coordinator.

Definition: A sequence of requests is R-balanced with respect to brick A if and only if the total cost of requests between any two consecutive requests to A is at most R.

A synchronous stream, i.e., a new request waits until requests to other bricks are processed, is R-balanced. An asynchronous stream may not be R-balanced, such as stream g in Example 1. It is worth noting that for an asynchronous stream, a coordinator may not be able to dispatch requests in their arriving order, unless the back-end has infinite queue depth. With a finite queue depth, the coordinator may have to hold requests whose destination brick has a full queue.

As can be seen from the above example of FIG. 11, multi-coordinator is just a matter of reordering streams. If in the request sequence each coordinator receives, the amount of requests between two consecutive requests to one brick is bounded, the reordered stream is R-balanced. TOTAL-DSFQ still works in this case.

On the other hand, if a client deliberately sends same-destination requests through one coordinator only, the reordered steam is not R-balanced and these requests all have zero delay. Therefore, the algorithm is no longer fair. In this case, communication among coordinators might be necessary to prevent malicious clients from overusing services.

Even the above extreme case is left out, it is difficult to guarantee an absolute bound on the balance after reordering. We seek statistical results instead, in this exemplary embodiment. The problem is formulated as follows. In the original stream, the number of requests between two consecutive requests to brick A is an independent, identically distributed random variable X, with expectation E(X) and variance Var (X). There are k coordinators $C_1 \ldots C_k$. The scheduling of requests is a mapping from an individual request to the k coordinators. Coordinator $C_i$ would receive a sequence of requests, let the number of requests between two consecutive requests to A be another random variable $Y_i$ with expectation $E(Y_i)$ and variance $Var(Y_i)$.

Theorem 3: If requests are independently mapped to all coordinators with equal probability, we have $$E(Y_i) = E(X) \qquad (10)$$

$$\text{Var}(Y_i) = \frac{k-1}{k}((E(X))^2 + E(X)) + \frac{1}{k}\text{Var}(X) \qquad (11)$$

If Var(X) is relatively large, $Var(Y_i)$ would be less and it goes down as the number of coordinators increases. The intuition is that multi-coordinator equalized the variance of X and result in a well-balanced stream. This implies that although the total share remains the same, the difference between normalized service of two streams varies less with multiple coordinators.

Different performance guarantees can be met by different delay functions. The delay functions can be calculated at coordinators locally so communication among schedulers is avoided. Various delay functions are possible, some of which are discussed further below.

Example 1

Suppose the service cost equals the throughput, if stream f requests service at brick A only, another equally weighted stream g requests service at brick A and many other bricks. Requests to different bricks are independent such that each can be sent at an arbitrary rate. Under TOTAL-DSFQ, eventually g would be completely blocked at A because the delay keeps increasing as more and more requests are sent to other bricks. Therefore, f and g are continuously backlogged at A but the total throughput of them are not equal. This Example 1 indicates that some restriction on streams and bricks may be implemented for total cost fair sharing.

In Example 1, if stream g received too much bandwidth on other bricks, delay of requests to brick A would keep increasing and eventually be blocked completely. This is not desirable in many cases. Thus, it may be desirable to guarantee a minimum bandwidth so the consumer can always make progress.

The problem can be solved under the above-described DSFQ framework, i.e., formulae (7-8), with a different delay function. If the delay function has an upper bound, there is a minimum bandwidth guarantee that is linear to the bound.

Theorem 4: Assume the delay function in formula (7) is non-negative and bounded by $D_f$ for stream f. Let weights be normalized, i.e., $0 \leq \phi_f \leq 1$ and $$\sum \phi_f = 1.$$

If f is backlogged on a brick, the aggregate cost of requests dispatched between two consecutive requests from f is at most $$\frac{1-\phi_f}{\phi_f} * D_f + \sum_g c_g^{max}$$

Proof: We prove the theorem using virtual streams. Let the new delay function be interpreted as a sequence of small virtual requests with total cost equal to the delay. If the last request of f is dispatched at $t_1$ and the next requests is dispatched at $t_2$, we have $W_f(t_1,t_2) \leq D_f$.

For any virtual stream g', $$W_{g'}(t_1,t_2) \leq \phi_g(v_2-v_1) + c_g^{max} \quad (12)$$

for backlogged virtual stream f', $$\phi_f(v_2-v_1) - c_f^{max} \leq W_f(t_1,t_2) \leq D_f \quad (13)$$

where $v_1=v(t_1)$ and $v_2=v(t_2)$ is the virtual time of SFQ.

Summing (12) up $$W_{other}(t_1, t_2) \leq (1-\phi_f)(v_2-v_1) + \sum_{g \neq f} c_g^{max} \leq \quad (14)$$

$$(1-\phi_f)\frac{D_f + c_f^{max}}{\phi_f} + \sum_{g \neq f} c_g^{max} \leq \frac{1-\phi_f}{\phi_f} * D_f + \sum_g c_g^{max}$$

If the cost of $c_f^i$ is defined as the service time of request $p_f^i$, the above theorem means the time interval between two consecutive requests dispatched at one brick is at most $$\frac{1-\phi_f}{\phi_f} * D_f + \sum c_g^{max}.$$

The average service interval is $$\frac{1-\phi_f}{\phi_f} * D_f.$$

With theorem 4, given a minimum bandwidth requirement, we can calculate the bound and design delay functions within the bound. For example, any function of $c_{f,A}^j$ that is continuous on domain $[0, c_f^{max}]$ is bounded. The advantage of this function family is that it is based on $c_{f,A}^j$ only and can be calculated at the back-end itself.

Below, an exemplary, simple delay function in the family is presented and analyzed.

$$\text{Delay}(p_{f,A}^j) = c_{f,A}^j * (n-1) \quad (15)$$

where n is the number of bricks stream f accesses in a time period. We call the new distributed algorithm with equations (7-8) (15) as STRIPE-DSFQ, because it works the same as TOTAL-DSFQ if the data is striped on n bricks.

Essentially, STRIPE-DSFQ is SFQ(D) at every single brick with discounted weights and provides proportional service at each brick, but not a guarantee of total proportional service. A mixed delay function of equations (9) and (15) may be employed in certain embodiments. That is, a Hybrid-DSFQ algorithm may be employed, such as a hybrid of the STRIPE-DSFQ and TOTAL-DSFQ algorithms. For instance, such a Hybrid-DSFQ algorithm may determine the minimum of the delay computed for a request by the STRIPE-DSFQ and TOTAL-DSFQ algorithms for a request directed to a given scheduler, and send to the given scheduler such minimum delay for the request.

Equation (16) below provides an exemplary hybrid algorithm for computing a delay for a request, which may be performed by a coordinator, according to one embodiment of the present invention.

$$\text{Delay}(p_{f,A}^j) = \min \left\{ \sum_{i=index(p_{f,A}^{j-1})+1}^{index(p_{f,A}^j)-1} c_f^i, c_{f,A}^j * (n-1) \right\} \quad (16)$$

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store information. Thus, the exemplary scheduling operations described above may be implemented in a system via computer-executable software code. The software code may run on any suitable processor-based system, such as the exemplary system of FIGS. 1, 2, and 7. The above-described operations for computing a delay to accompany a request made to a scheduler (according to certain embodiments) may be performed via computer-executable software code, which may be employed at a coordinator as discussed above. The exemplary operations described above as being performed by a scheduler, such as executing a DSFQ algorithm for scheduling service, may be performed via computer-executable software code, which may be employed at a scheduler as discussed above.

What is claimed is:
1. A method comprising:
assigning a first weight to a first consumer and a second weight to a second consumer;
receiving at a first scheduler a request for service by a first resource to said first consumer;
receiving at a second scheduler a request for service by a second resource to said first consumer, wherein the first scheduler manages services provided by the first resource, and the second scheduler manages services provided by the second resource;
receiving at said first scheduler a request for service by said first resource to said second consumer;
scheduling, by said first and second schedulers executing in a processor-based system, service by said first and second resources to said first and second consumers, wherein said scheduling maintains total service provided by the first and second resources to the first and second consumers in proportion to the respective weights of said first and second consumers without requiring said first and second schedulers to communicate with each other;

receiving a consumer request for service from said first consumer at a first coordinator;

in response to said consumer request for service from said first consumer, said first coordinator (a) sending to said first scheduler said request for service by said first resource to said first consumer and (b) sending to said second scheduler said request for service by said second resource to said first consumer;

receiving a consumer request for service from said second consumer at a second coordinator; and in response to said consumer request for service from said second consumer, said second coordinator sending to said first scheduler said request for service by said first resource to said second consumer, requested for said first consumer in the request received at said second scheduler for service by said second resource to said first consumer.

2. The method of claim 1 wherein said scheduling is work-conserving.

3. The method of claim 1 wherein said scheduling maintains said total service provided by the first and second resources to the first and second consumers in proportion to the respective weights of said first and second consumers when requests are backlogged for at least one of said first and second resources.

4. The method of claim 1 wherein said scheduling does not maintain said total service provided by the first and second resources to the first and second consumers in proportion to the respective weights of said first and second consumers when requests are not backlogged for at least one of said first and second resources.

5. The method of claim 1 further comprising:
receiving at the second scheduler a request for service by said second resource to said second consumer, wherein said scheduling maintains total service provided by the first and second resources to the first and second consumers in proportion to the respective weights of said first and second consumers.

6. The method of claim 5 wherein said scheduling maintains said total service provided by the first and second resources to the first and second consumers in proportion to the respective weights of said first and second consumers when requests are backlogged for at least one of said first and second resources.

7. The method of claim 1 further comprising:
receiving at said first scheduler information indicating an amount of service
wherein said first and second coordinators do not communicate with each other information about said consumer requests.

8. The method of claim 7 wherein said information indicating said amount of service comprises one selected from the group consisting of: information providing an actual amount of service requested for said first consumer at said second scheduler for service by said second resource to said first consumer, information providing an extrapolated proportion of service requested for said first consumer from said first scheduler relative to an overall number of schedulers from which service is requested for said first consumer, and information derived from a combination of the foregoing.

9. The method of claim 7 wherein said information is derived in accordance with a delay function.

10. The method of claim 7 wherein said receiving said information comprises:
receiving said information with said request received at said first scheduler for service by said first resource to said first consumer.

11. The method of claim 7 wherein said scheduling comprises:
using, by said first scheduler, the received information for allocating service from said first resource among said first and second consumers.

12. The method of claim 7 further comprising:
receiving at said second scheduler information indicating an amount of service requested for said first consumer in the request received at said first scheduler for service by said first resource to said first consumer.

13. The method of claim 12 wherein said scheduling comprises:
using, by said second scheduler, the received information for allocating service from said second resource among said first and second consumers.

14. The method of claim 1 further comprising:
receiving at said first scheduler information indicating a delay for the received request for service by said first resource to said first consumer, wherein said delay corresponds to an amount of service requested for said first consumer in the request received at said second scheduler for service by said second resource to said first consumer.

15. The method of claim 14 wherein said scheduling comprises:
using, by said first scheduler, the delay for allocating service from said first resource among said first and second consumers.

16. The method of claim 1 wherein said scheduling comprises:
using a fair queuing algorithm by each of said first and second schedulers for scheduling service by said first and second resources to said first and second consumers.

17. The method of claim 1 wherein said scheduling comprises:
using a Distributed Start-time Fair Queuing (DSFQ) algorithm by said first and second schedulers.

18. The method of claim 1 wherein said scheduling comprises:
using a STRIPE-Distributed Start-time Fair Queuing (DSFQ) algorithm by said first and second schedulers.

19. The method of claim 1 wherein said scheduling comprises:
using a Hybrid-Distributed Start-time Fair Queuing (DSFQ) algorithm by said first and second schedulers.

20. The method of claim 1 wherein said first and second coordinators determine which ones of said first and second resources to be used for servicing the received consumer requests from said first and second consumers.

21. The method of claim 1 wherein said first coordinator communicates to said first scheduler information indicating a corresponding delay for the request for service by said first resource to said first consumer, wherein said delay corresponds to an amount of service requested by said first coordinator for said first consumer in the request sent from the first coordinator to the second scheduler requesting service by said second resource to said first consumer.

22. The method of claim 1 wherein said first and second consumers are processes.

23. The method of claim 1 wherein said first and second resources are data storage resources.

24. The method of claim 23 wherein the requests for service comprise requests for access to data stored in said data storage resources.

25. The method of claim 1 wherein said first and second resources comprise at least one selected from the group consisting of:
computing resources, networking resources, and web servers.

26. A method comprising:
assigning a first weight to a first consumer and a second weight to a second consumer;
receiving at a first scheduler a request for service by a first resource to said first consumer;
receiving at a second scheduler a request for service by a second resource to said first consumer, wherein the first scheduler manages services provided by the first resource, and the second scheduler manages services provided by the second resource;
receiving at said first scheduler a request for service by said first resource to said second consumer; and
scheduling, by said first and second schedulers executing in a processor-based system, service by said first and second resources to said first and second consumers, wherein said scheduling maintains total service provided by the first and second resources to the first and second consumers in proportion to the respective weights of said first and second consumers without requiring said first and second schedulers to communicate with each other, wherein said scheduling comprises:
using a Distributed Start-time Fair Queuing (DSFQ) algorithm by said first and second schedulers,
wherein said DSFQ algorithm performs said scheduling in accordance with:

$$S(p_{f,A}^j) = \max\left\{v_A(A(p_{f,A}^j)), F(p_{f,A}^{j-1}) + \frac{\text{Delay}(p_{f,A}^j)}{\phi_f}\right\}; \text{ and}$$

$$F(p_{f,A}^j) = S(p_{f,A}^j) + \frac{c_{f,A}^j}{\phi_f}.$$

where $p_{f,A}^j$ denotes an ith request of stream f, $c_{f,A}^j$ denotes a cost of request $p_{f,A}^j$, $\phi_f$ is a weight assigned to stream f, $A(p_{f,A}^j)$ is an arrival time at a scheduler, $v_A(A(p_{f,A}^j))$ is a virtual time, A represents a storage node, $\text{Delay}(p_{f,A}^j)$ is a delay function, $F(p_{f,A}^0)=0$, and $v_A(0)=0$.

27. The method of claim 26 wherein $$\text{Delay}(p_{f,A}^j) = \sum_{i=\text{index}(p_{f,A}^{j-1})+1}^{\text{index}(p_{f,A}^j)-1} c_f^i, A.$$

28. A method comprising:
assigning a first weight to a first consumer and a second weight to a second consumer;
receiving at a first coordinator a request from said first consumer for service;
determining by said first coordinator at least one of a plurality of resources for providing the requested service to said first consumer;
receiving at a second coordinator a request from said second consumer for service;
determining by said second coordinator said at least one of said plurality of resources for providing the requested service to said second consumer; and
scheduling, by a processor-based system, overall service from said at least one resource that is determined for providing the requested services to said first and second consumers in proportion to the respective weights of said first and second consumers without requiring said first and second coordinators to communicate with each other, wherein said scheduling comprises scheduling service by said schedulers without requiring said schedulers to communicate with each other, wherein each of said plurality of resources has associated therewith a corresponding scheduler, and wherein each of the schedulers manages scheduling of services provided by a corresponding one of the resources;
said first coordinator sending a request for service to a corresponding scheduler associated with each of said at least one of the plurality of resources that is determined for providing the requested service to said first consumer; and
said second coordinator sending a request for service to said corresponding scheduler associated with each of said at least one the plurality of resources that is determined for providing the requested service to said second consumer.

29. The method of claim 28 further comprising:
said first coordinator communicating information indicating a corresponding delay for said request for service for said first consumer sent to a first scheduler that corresponds to an amount of service requested by said first coordinator for said first consumer from at least one other scheduler.

30. The method of claim 29 wherein said delay indicates one selected from the group consisting of: an actual amount of service requested for said first consumer at said at least one other scheduler for service to said first consumer, information providing an extrapolated proportion of service requested for said first consumer from said first scheduler relative to an overall number of schedulers from which service is requested for said first consumer, and information derived from a combination of the foregoing.

31. The method of claim 29 wherein said delay is derived in accordance with a delay function.

32. The method of claim 29 wherein said scheduling comprises:
said first scheduler using said delay for scheduling service from the scheduler's respective resource for said first consumer.

33. The method of claim 28 wherein at least one request received by at least one of said first and second coordinators is determined to require service by multiple ones of said resources.

34. The method of claim 28 wherein said determining by said first coordinator said at least one of the plurality of resources for providing the requested service to said first consumer comprises:
determining by said first coordinator multiple ones of said plurality of resources to be used for providing the requested service to said first consumer.

35. The method of claim 34 wherein said determining by said second coordinator said at least one of the plurality of resources for providing the requested service to said second consumer comprises:

determining by said second coordinator multiple ones of said plurality of resources to be used for providing the requested service to said second consumer.

36. The method of claim 28 wherein said scheduling comprises:
scheduling said overall service from said at least one resource that is determined for providing the requested services to said first and second consumers in proportion to the respective weights of said first and second consumers when requests are backlogged for the at least one resource that is determined for providing the requested services.

37. A method comprising:
employing a plurality of coordinators for enabling access to at least one of a plurality of resources for servicing requests from consumers;
employing a weighted proportional-share scheduler for each of said plurality of resources, wherein each proportional-share scheduler manages scheduling of services provided by a corresponding one of the resources, and each proportional-share scheduler is executed in a processor-based system;
receiving at a particular one of the coordinators a request from a particular one of the consumers for service;
determining, by said particular coordinator, one or more of said plurality of resources to be accessed for servicing said received request;
communicating, from said particular coordinator to a corresponding scheduler of each of the one or more of said plurality of resources determined to be accessed for servicing said received request, a request for service by such resource and information indicating an amount of service requested by said particular coordinator from others of said plurality of resources for servicing said received request;
allocating, using a weighted proportional-share algorithm by said corresponding scheduler of each of the one or more of said plurality of resources determined to be accessed for servicing said received request, an amount of service based on said information indicating said amount of service requested by said particular coordinator from others of said plurality of resources for servicing said received request; and
when requests exceed capacity, the schedulers providing an overall allocation of service by the determined one or more of said plurality of resources in accordance with the weighted proportional-share algorithm,
wherein said weighted proportional-share algorithm comprises a Distributed Start-time Fair Queuing (DSFQ) algorithm.

38. The method of claim 37 wherein said DSFQ algorithm performs said scheduling in accordance with:

$$S(p_{f,A}^j) = \max\left\{v_A(A(p_{f,A}^j)), F(p_{f,A}^{j-1}) + \frac{\text{Delay}(p_{f,A}^j)}{\phi_f}\right\}; \text{ and}$$

$$F(p_{f,A}^j) = S(p_{f,A}^j) + \frac{c_{f,A}^j}{\phi_f}.$$

where $p_{f,A}^j$ denotes an ith request of stream f, $c_{f,A}^j$ denotes a cost of request $p_{f,A}^j$, $\phi_f$ is a weight assigned to stream f, $A(p_{f,A}^j)$ is an arrival time at a scheduler, $v_A(A(p_{f,A}^j))$ is a virtual time, A represents a storage node, $\text{Delay}(p_{f,A}^j)$ is a delay function, $F(p_{f,A}^0)=0$, and $v_A(0)=0$.

39. The method of claim 38 wherein $$\text{Delay}(p_{f,A}^j) = \sum_{i=\text{index}(p_{f,A}^{j-1})+1}^{\text{index}(p_{f,A}^j)-1} c_f^i, A.$$

40. The method of claim 37 wherein said plurality of coordinators do not communicate information to each other about said requests.

41. A method of providing differentiated service to consumers of distributed resources, the method comprising:
employing a plurality of weighted proportional-share schedulers executing in a processor-based system, where each of said schedulers is associated with a respective one of a plurality of distributed resources, and wherein each of said schedulers manages scheduling of services provided by a corresponding one of the resources;
receiving at a first of said schedulers a request for service to a consumer by said first scheduler's respective resource;
receiving at a second of said schedulers a request for service to said consumer by said second scheduler's respective resource;
receiving at said first scheduler information indicating an amount of service requested by said consumer with respect to said second scheduler;
receiving at said second scheduler information indicating an amount of service requested by said consumer with respect to said first scheduler;
said first and second schedulers using a weighted proportional-share algorithm for scheduling service for the consumer using the received information such that the total service provided by the respective resources of the first and second schedulers is governed by the weighted proportional-share algorithm, wherein said weighted proportional-share algorithm comprises a Distributed Start-time Fair Queuing (DSFQ) algorithm, wherein said DSFQ algorithm performs said scheduling in accordance with:

$$S(p_{f,A}^j) = \max\left\{v_A(A(p_{f,A}^j)), F(p_{f,A}^{j-1}) + \frac{\text{Delay}(p_{f,A}^j)}{\phi_f}\right\}; \text{ and}$$

$$F(p_{f,A}^j) = S(p_{f,A}^j) + \frac{c_{f,A}^j}{\phi_f}.$$

where $p_{f,A}^j$ denotes an ith request of stream f, $c_{f,A}^j$ denotes a cost of request $p_{f,A}^j$, $\phi_f$ is a weight assigned to stream f, $A(p_{f,A}^j)$ is an arrival time at a scheduler, $v_A(A(p_{f,A}^j))$ is a virtual time, A represents a storage node, $\text{Delay}(p_{f,A}^j)$ is a delay function, $F(p_{f,A}^0)=0$, and $v_A(0)=0$ wherein $$\text{Delay}(p_{f,A}^j) = \sum_{i=\text{index}(p_{f,A}^{j-1})+1}^{\text{index}(p_{f,A}^j)-1} c_f^i, A.$$

42. The method of claim 41 wherein said first and second schedulers do not communicate with each other.

43. The method of claim 42 wherein said weighted proportional-share algorithm of said first scheduler uses said information indicating an amount of service requested by said consumer from said second scheduler; and wherein said weighted proportional-share algorithm of said second scheduler uses said information indicating an amount of service requested by said consumer from said first scheduler.

44. Computer-executable software code stored to a computer-readable storage medium, the computer-executable software code comprising:
- code for receiving a first request for service by a first resource to a first consumer;
- code for receiving a second request for service by said first resource to a second consumer;
- code for receiving information indicating a delay for at least said first request, wherein said delay corresponds to an amount of service requested for said first consumer to be provided by a second resource;
- code for scheduling service by said first resource to said first and second consumers based at least in part on said delay;
- code for receiving a third request for service by said second resource to said first consumer;
- code for receiving information indicating a delay for at least said third request, wherein said delay corresponds to an amount of service requested for said first consumer to be provided by said first resource; and
- code for scheduling service by said second resource to said first consumer based at least in part on said delay,
- wherein said code for receiving said first request, said code for receiving said second request, said code for receiving said information indicating said delay for at least said first request, and said code for scheduling service by said first resource comprise a first scheduler; and wherein said code for receiving said third request, said code for receiving said information indicating said delay for at least said third request, and said code for scheduling service by said second resource comprise a second scheduler.

45. The computer-executable software code of claim 44 wherein said first and second schedulers do not communicate with each other.

46. The computer-executable software code of claim 45 wherein the first and second schedulers maintain total service provided by the first and second resources to the first and second consumers in proportion to respective weights assigned to said first and second consumers.

* * * * *

UNITED STATES PATENT AND TRADEMARK OFFICE
CERTIFICATE OF CORRECTION

PATENT NO. : 7,823,154 B2
APPLICATION NO. : 11/228901
DATED : October 26, 2010
INVENTOR(S) : Yin Wang et al.

It is certified that error appears in the above-identified patent and that said Letters Patent is hereby corrected as shown below:

In column 19, lines 21-23, in Claim 1, delete "requested for said first consumer in the request received at said second scheduler for service by said second resource to said first consumer." and
insert -- wherein said first and second coordinators do not communicate with each other information about said consumer requests. --, therefor.

In column 19, lines 55-57, in Claim 7, delete "wherein said first and second coordinators do not communicate with each other information about said consumer requests." and
insert -- requested for said first consumer in the request received at said second scheduler for service by said second resource to said first consumer. --, therefor.

In column 21, line 43, in Claim 26, after " $F(p^j_{f,A}) = S(p^j_{f,A}) + \dfrac{c^j_{f,A}}{\phi_f}$ " delete "." and insert -- , --, therefor.

In column 23, line 60, in Claim 38, after " $F(p^j_{f,A}) = S(p^j_{f,A}) + \dfrac{c^j_{f,A}}{\phi_f}$ " delete "." and insert -- , --, therefor.

In column 23, line 64, in Claim 38, delete " $A(p_{f,A}^j)$ " and insert -- $A(p^j_{f,A})$ --, therefor.

In column 24, line 48, in Claim 41, after " $F(p^j_{f,A}) = S(p^j_{f,A}) + \dfrac{c^j_{f,A}}{\phi_f}$ " delete "." and insert -- , --, therefor.

Signed and Sealed this
Twelfth Day of April, 2011

David J. Kappos
*Director of the United States Patent and Trademark Office*

CERTIFICATE OF CORRECTION (continued)
U.S. Pat. No. 7,823,154 B2

In column 24, line 55, in Claim 41, delete "$F(p_{f,A})=0,$" and insert -- $F(p_{f,A}^{a})=0$ --, therefor.